(12) United States Patent
Wijting et al.

(10) Patent No.: US 9,408,212 B2
(45) Date of Patent: Aug. 2, 2016

(54) METHODS AND APPARATUSES FOR FACILITATING USE OF CARRIER AGGREGATION FOR DEVICE-TO-DEVICE COMMUNICATIONS

(75) Inventors: Carl Simon Wijting, Espoo (FI); Mika Petri Olavi Rinne, Espoo (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 141 days.

(21) Appl. No.: 14/355,784

(22) PCT Filed: Nov. 10, 2011

(86) PCT No.: PCT/IB2011/055038
§ 371 (c)(1),
(2), (4) Date: May 1, 2014

(87) PCT Pub. No.: WO2013/068788
PCT Pub. Date: May 16, 2013

(65) Prior Publication Data
US 2014/0247802 A1    Sep. 4, 2014

(51) Int. Cl.
*H04W 72/04* (2009.01)
*H04W 76/02* (2009.01)
*H04L 5/00* (2006.01)

(52) U.S. Cl.
CPC .......... *H04W 72/0453* (2013.01); *H04L 5/001* (2013.01); *H04L 5/0098* (2013.01); *H04W 76/023* (2013.01); *H04W 76/025* (2013.01)

(58) Field of Classification Search
CPC ..... H04L 5/001; H04L 5/0053; H04L 5/0098; H04L 2001/0096; H04L 1/0026; H04W 72/042; H04W 24/10; H04W 24/00; H04W 72/0453; H04W 76/04

USPC .................................. 370/329, 252, 328, 315
See application file for complete search history.

(56) References Cited

U.S. PATENT DOCUMENTS

| | | | |
|---|---|---|---|
| 2008/0002658 A1* | 1/2008 | Soliman | H04W 76/023 370/343 |
| 2011/0228666 A1* | 9/2011 | Barbieri | H04W 76/023 370/216 |

(Continued)

FOREIGN PATENT DOCUMENTS

WO    2012039656    3/2012

OTHER PUBLICATIONS

International Search Report and Written Opinion received for corresponding Patent Cooperation Treaty Application No. PCT/IB2011/055038, dated Dec. 3, 2012, 12 pages.
Doppler K. et al. "Device-device communication as an underlay to LTE-advanced networks;" Communications Magazine, IEEE, Dec. 2009, vol. 47, Issue 12, pp. 42-49.

(Continued)

*Primary Examiner* — Dang Ton
*Assistant Examiner* — Sai Aung
(74) *Attorney, Agent, or Firm* — Mintz Levin Cohn Ferris Glovsky and Popeo, P.C.

(57) ABSTRACT

Methods and apparatuses are provided for facilitating use of carrier aggregation for device-to-device communications. A method may include establishing, at a first communication apparatus, a carrier aggregation configuration defining a set of one or more component carriers usable for device-to-device communication between the first communication apparatus and a second communication apparatus. The method may further include causing the first communication apparatus to engage in device-to-device communication with the second communication apparatus in accordance with the established carrier aggregation configuration. Corresponding apparatuses are also provided.

16 Claims, 11 Drawing Sheets

(56) References Cited

U.S. PATENT DOCUMENTS

| | | | |
|---|---|---|---|
| 2012/0077510 A1* | 3/2012 | Chen .................... | H04W 28/26 455/452.1 |
| 2013/0188552 A1* | 7/2013 | Kazmi .................... | H04L 5/001 370/315 |
| 2014/0112282 A1* | 4/2014 | Wijting .................... | H04L 5/001 370/329 |

OTHER PUBLICATIONS

Morales-Tirado L. "Cognitive radio technology: Principles and practice; Computing, networking and Communications (ICNC)", 2012 International Conference on Jan. 30-Feb. 2, 2012; Youping Zhao Sch. of ELectron & Inf. Eng, Beijing, Jiantong Univ., Beijing, China. Http://ieeeplore.ieee.org/xpl/articleDetails.jsp?arnumber=6167503.

* cited by examiner

METHODS AND APPARATUSES FOR FACILITATING USE OF CARRIER AGGREGATION FOR DEVICE-TO-DEVICE COMMUNICATIONS

RELATED APPLICATION

This application was originally filed as PCT Application No. PCT/IB2011/055038 filed Nov. 10, 2011.

TECHNOLOGICAL FIELD

Example embodiments of the present invention relate generally to communications technology and, more particularly, relate to methods and apparatuses for facilitating use of carrier aggregation for device-to-device communications.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users. However, as the number of wireless communication device users continues to increase, the strain on the limited resources in the licensed spectrum also increases.

To provide an increased number of services to a large number of users, efficient use of the available radio network resources has become an important consideration. One ongoing area of development for providing for more efficient use of radio network resources is the development of device-to-device (D2D) communication technologies. D2D communication technologies may use radio resources of a hosting cellular system, but allow two computing devices, such as mobile terminals (also referred to as user equipment (UE)), to communicate directly with each other without routing their communications through components of the cellular system. Thus, the direct communication link between mobile terminals engaged in D2D communication may result in reduced end-to-end delay time for data exchanged between the terminals as compared to communication routed via the cellular system components. D2D communication may accordingly provide support for use of peer-to-peer applications, head-to-head gaming applications, collaboration, and/or the like by users of mobile terminals within close proximity of each other.

BRIEF SUMMARY

Methods, apparatuses, and computer program products are herein provided for facilitating use of carrier aggregation for device-to-device communications. Systems, methods, apparatuses, and computer program products in accordance with various embodiments may provide several advantages to computing devices, computing device users, networks, and network providers. Some example embodiments facilitate aggregation of component carriers on D2D communication links. In this regard, some example embodiments provide for the establishment of a carrier aggregation configuration defining a set of one or more component carriers usable for D2D communication between a first communication apparatus and a second communication apparatus. In accordance with some such example embodiments, the set of component carriers usable for D2D communication may be selectively activated and deactivated independent of component carriers that may be used for communication between a communication apparatus and an access point for a serving network.

In an example embodiment, a method is provided, which comprises establishing, at a first communication apparatus, a carrier aggregation configuration defining a set of one or more component carriers usable for device-to-device communication between the first communication apparatus and a second communication apparatus. The method of this example embodiment further comprises causing the first communication apparatus to engage in device-to-device communication with the second communication apparatus in accordance with the established carrier aggregation configuration.

In another example embodiment, an apparatus comprising at least one processor and at least one memory storing computer program code is provided. The at least one memory and stored computer program code are configured, with the at least one processor, to cause the apparatus of this example embodiment to at least establish, at a first communication apparatus, a carrier aggregation configuration defining a set of one or more component carriers usable for device-to-device communication between the first communication apparatus and a second communication apparatus. The at least one memory and stored computer program code are configured, with the at least one processor, to further cause the apparatus of this example embodiment to cause the first communication apparatus to engage in device-to-device communication with the second communication apparatus in accordance with the established carrier aggregation configuration.

In another example embodiment, a computer program product is provided. The computer program product of this example embodiment includes at least one computer-readable storage medium having computer-readable program instructions stored therein. The program instructions of this example embodiment comprise program instructions configured to establish, at a first communication apparatus, a carrier aggregation configuration defining a set of one or more component carriers usable for device-to-device communication between the first communication apparatus and a second communication apparatus. The program instructions of this example embodiment further comprise program instructions configured to cause the first communication apparatus to engage in device-to-device communication with the second communication apparatus in accordance with the established carrier aggregation configuration.

In another example embodiment, an apparatus is provided, which comprises means for establishing, at a first communication apparatus, a carrier aggregation configuration defining a set of one or more component carriers usable for device-to-device communication between the first communication apparatus and a second communication apparatus. The apparatus of this example embodiment further comprises means for causing the first communication apparatus to engage in device-to-device communication with the second communication apparatus in accordance with the established carrier aggregation configuration.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
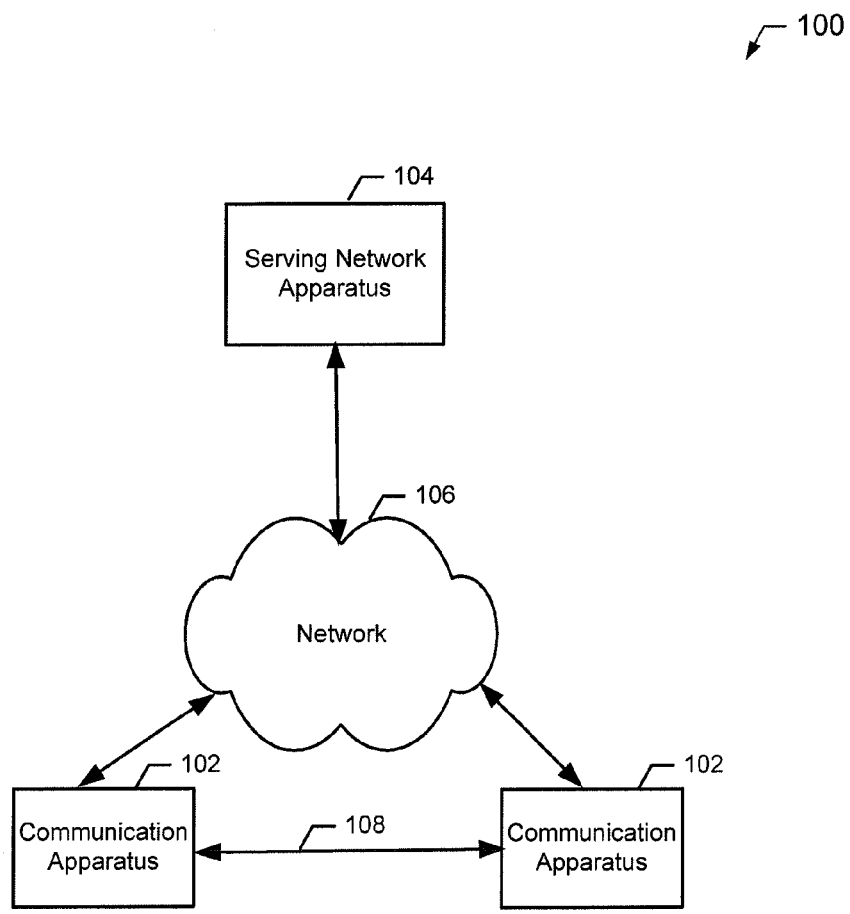
FIG. 1 illustrates a system for facilitating use of carrier aggregation for device-to-device communications according to some example embodiments.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for facilitating use of carrier aggregation for device-to-device communications according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating use of carrier aggregation for device-to-device communications, numerous other configurations may also be used to implement embodiments of the present invention.

The system 100 may include a plurality of communication apparatuses 102 and a serving network apparatus 104. The system 100 may further comprise a network 106. The network 106 may comprise one or more wireline networks, one or more wireless networks, or some combination thereof. The network 106 may, for example, comprise a serving network (e.g., a serving cellular network) for one or more communication apparatuses 102. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) Long Term Evolution (LTE) standards (including current and future implementations of Long Term Evolution-Advanced (LTE-A) standards), current and future implementations of International Telecommunications Union (ITU) International Mobile Telecommunications—Advanced (IMT-A) systems standards, and/or the like. It will be appreciated, however, that where references herein are made to a network standard and/or terminology particular to a network standard, the references are provided merely by way of example and not by way of limitation.

One or more of the communication apparatuses 102 may be configured to communicate with the serving network apparatus 104 over the network 106. In this regard, the serving network apparatus 104 may comprise one or more nodes of the network 106. For example, in some example embodiments, the serving network apparatus 104 may be at least partially embodied on one or more computing devices that comprise an element of a radio access network (RAN) portion of the network 106. In this regard, the serving network apparatus 104 may, for example, be at least partially embodied on one or more access points of the network 106 (for example, a base station, base transceiver station (BTS), node B, evolved node B (eNB), and/or the like), which may, for example be configured to provide access to the network 106 (e.g., via a radio uplink) to one or more of the communication apparatuses 102. In some example embodiments wherein the serving network apparatus 104 comprises multiple network access points (e.g., multiple eNBs) for the network 106, the multiple network access points may be configured to communicate with each other via an interface, such as an X2 interface. Additionally or alternatively, in some example embodiments, the serving network apparatus 104 may comprise one or more dedicated computing devices that comprise a portion of a RAN portion of the network 106.

In some example embodiments, the serving network apparatus 104 may be at least partially embodied on one or more computing devices that comprise a core network (CN) entity of the network 106. In this regard, the serving network apparatus 104 may, for example, be at least partially embodied on a mobility management entity (MME) of the core network, a gateway, a server allocated in the core network, some combination thereof, or the like. Additionally or alternatively, the serving network apparatus 104 may comprise one or more dedicated computing devices that comprise a portion of a CN portion of the network 106. As a further example, in the serving network apparatus 104 may comprise a device-to-device registration server function (DRSF). As still a further example, the serving network apparatus 104 may comprise an access network discovery and selection function (ANDSF). Accordingly, the serving network apparatus 104 may comprise a network node or a plurality of network nodes collectively configured to perform one or more operations attributed to the serving network apparatus 104 as described with respect to various example embodiments.

A communication apparatus 102 may be configured to establish a D2D connection (also referred to as a D2D link) with another device, such as another communication apparatus 102, and engage in D2D communication over the D2D connection. In this regard, a set of two communication apparatuses 102 are illustrated as communicating via a D2D connection 108 for purposes of example in FIG. 1. However, it will be appreciated that the system 100 may include multiple sets of communication apparatuses engaged in D2D communications. Further, in some example embodiments, a set of communication apparatuses 102 engaged in D2D communication may comprise three or more communication apparatuses 102 having established respective D2D connections between them. In this manner, in various example embodiments, the D2D connections may operate as a set of individual D2D communication links among the set of communication apparatuses, and/or the D2D connections may further include mechanisms for networking among the set of communication apparatuses.

A D2D connection, such as the D2D connection 108 may, for example, comprise a direct radio link between two or more apparatuses (e.g., communication apparatuses 102) and may enable direct inter-device communication without routing communications via one or more elements of the network 106. The D2D connection 108 may use radio resources of the network 106 (e.g., the network serving the communication apparatuses 102). In this regard, communication apparatuses 102 engaged in D2D communication may communicate data via a D2D link utilizing network resources of the network 106 that may be controlled and/or allocated by the serving network apparatus 104. However, rather than communicating indirectly data via another node(s) of the network 106, such as a network access point for the network 106, data may be communicated directly between the communication apparatuses over the D2D link.

In some embodiments, a communication apparatus 102 may be configured with cognitive radio (CR) capabilities such that a communication apparatus 102 may be configured to sense another device within a proximate range and detect whether sensed device is configured for D2D communication. As another example, in some example embodiments in which a communication apparatus 102 may be configured with CR capabilities, a communication apparatus 102 may be configured to determine another device based at least in part on information that may be included in a repository or a database, such as may be locally accessible and/or accessible from another device over a network.

A communication apparatus 102 may be embodied as any computing device, such as, for example, a desktop computer, laptop computer, tablet computing device, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In some example embodiments, a communication apparatus 102 may comprise cellular communication device configured to operate on a serving cellular network.

Figure 2:
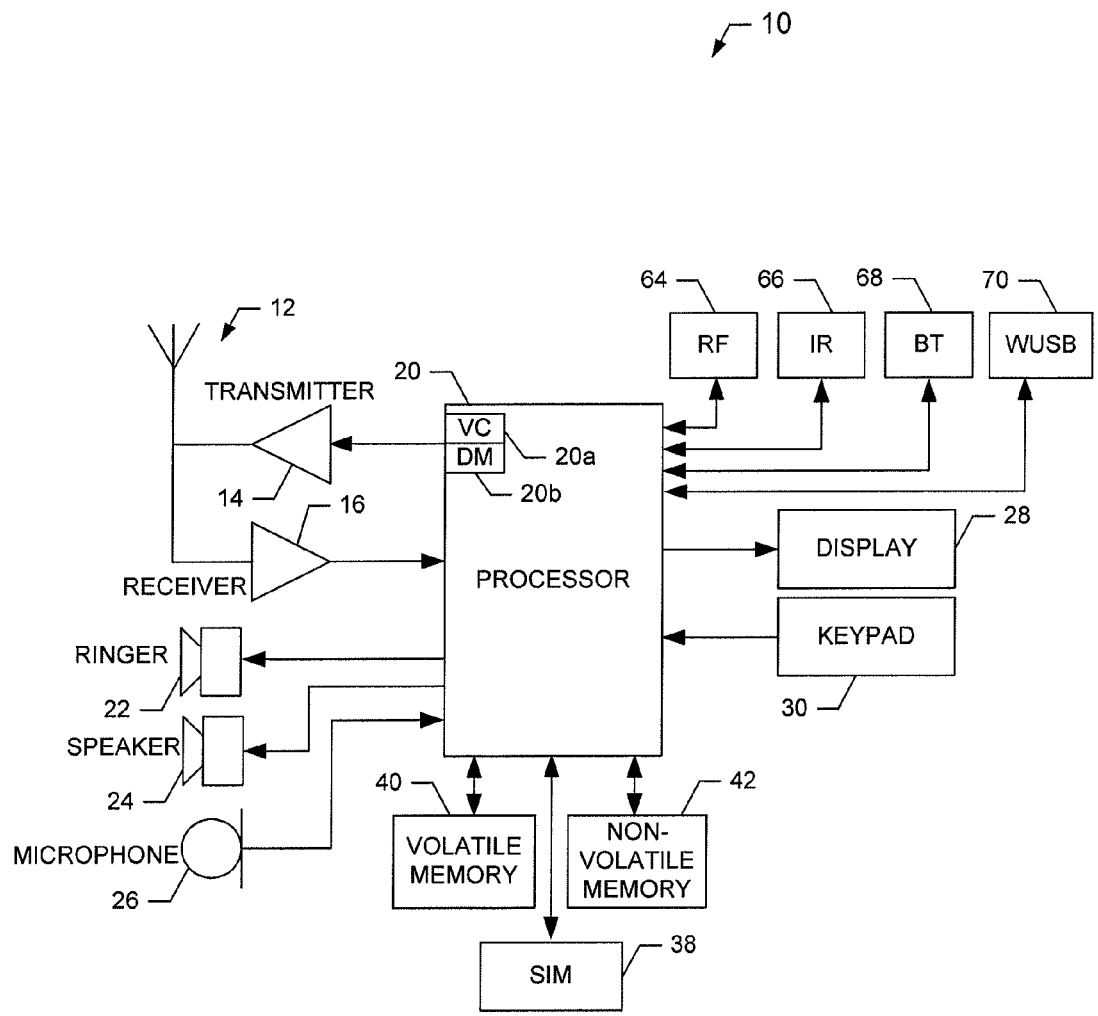
FIG. 2 is a schematic block diagram of a mobile terminal according to an example embodiment.

In some example embodiment, a communication apparatus 102 may be embodied as a mobile terminal, such as that illustrated in FIG. 2. In this regard, FIG. 2 illustrates a block diagram of a mobile terminal 10 representative of some embodiments of a communication apparatus 102. It should be understood, however, that the mobile terminal 10 illustrated and hereinafter described is merely illustrative of one type of communication apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments.

As shown, the mobile terminal 10 may include an antenna 12 (or multiple antennas 12) in communication with a transmitter(s) 14 and a receiver(s) 16. The transmitter(s) 14 and receiver(s) 16 may, for example, enable communication between the mobile terminal 10 and a network access point (for example, a base station, node B, evolved node B, and/or the like). Additionally or alternatively, the transmitter(s) 14 and receiver(s) 16 may, for example, enable communication between the mobile terminal 10 and another device (for example, another mobile terminal 10) via D2D communication. In some example embodiments, a first transmitter 14 and first receiver 16 may be used for communication with a network access point, and a second transmitter 14 and second receiver 16 may be used for D2D communication. However, in other example embodiments, a given transmitter 14 and a given receiver 16 may be used both for communication with a network access point and for D2D communication. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various generations of communication protocols, including, for example third generation (3G) and fourth generation (4G) communication protocols, as well as any next generation communication protocols, Internet Protocol Multimedia Subsystem (IMS) communication protocols (for example, session initiation protocol (SIP)), and/or the like. For example, the mobile terminal may be capable of operating in accordance with wireless communication protocols such as IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with wireless communication protocols such as General Packet Radio Service (GPRS), Enhanced Data GSM Environment (EDGE), and/or the like. Further, for example, the mobile terminal may be capable of operating in accordance with wireless communication protocols such as Universal Mobile Telecommunications System (UMTS), Code Division Multiple Access 2000 (CDMA2000), Wideband Code Division Multiple Access (WCDMA), High-Speed Packet Access (HSPA), Time Division-Synchronous Code Division Multiple Access (TD-SCDMA), and/or the like. The mobile terminal may be additionally capable of operating in accordance with 4G wireless communication protocols such as Long Term Evolution (LTE) or Evolved Universal Terrestrial Radio Access Network (E-UTRAN), LTE-Advanced, IMT-Advanced and/or the like. Additionally, for example, the mobile terminal may be capable of operating in accordance with other fourth-generation wireless communication protocols and/or the like as well as similar wireless communication protocols that may be developed in the future. In some example embodiments, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks. Any level of security protocols, including, for example, Transport Layer Security (TLS), may be applied together with the aforementioned communication protocols.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), an input device enabling motion detection (for example, detection of motion of a human body, a limb of a body, eye-movement, and/or the like) and/or other input device. In embodiments including a keypad, the keypad may comprise numeric (0-9) and related keys (#, *), symbolic keys, characters of any known language and possibly future evolved languages from any of currently known civilizations or yet undiscovered ones and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards, or Bluetooth On the Go (BTOG). In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, its evolved version Universal (USIM), a removable user identity module (R-UIM), a software SIM and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
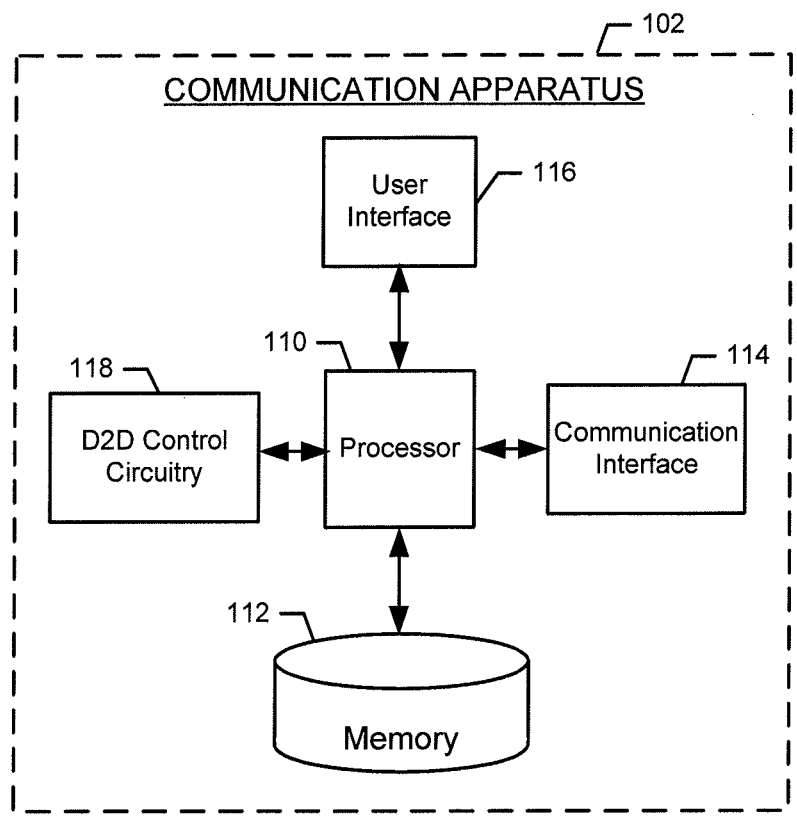
FIG. 3 illustrates a block diagram of a communication apparatus according to some example embodiments.

Referring now to FIG. 3, FIG. 3 illustrates a block diagram of a communication apparatus 102 according to some example embodiments. The communication apparatus 102 may include various means for performing the various functions herein described. These means may comprise one or more of a processor 110, memory 112, communication interface 114, user interface 116, or device-to-device (D2D) control circuitry 118. The means of the communication apparatus 102 as described herein may be embodied as, for example, circuitry, hardware elements (e.g., a suitably programmed processor, combinational logic circuit, and/or the like), a computer program product comprising a computer-readable medium (for example memory 112) storing computer-readable program instructions (e.g., software or firmware) that may be performed by a suitably configured processing device (e.g., the processor 110), or some combination thereof.

In some example embodiments, one or more of the means illustrated in FIG. 3 may be embodied as a chip or chip set. In other words, the communication apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or D2D control circuitry 118 may be embodied as a chip or chip set. The communication apparatus 102 may therefore, in some example embodiments, be configured to implement embodiments of the present invention on a single chip or as a single "system on a chip." As another example, in some example embodiments, the communication apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the communication apparatus 102 as described herein. The plurality of processors may be embodied on a single computing device or distributed across a plurality of computing devices collectively configured to function as the communication apparatus 102. In embodiments wherein the communication apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the communication apparatus 102 to perform one or more of the functionalities of the communication apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 3 as a single memory, the memory 112 may comprise a plurality of memories. The plurality of memories may be embodied on a single computing device or may be distributed across a plurality of computing devices collectively configured to function as the communication apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communication apparatus 102 is embodied as a mobile terminal 10, the memory 112 may comprise the volatile memory 40 and/or the non-volatile memory 42. The memory 112 may be configured to store information, data, applications, instructions, or the like for enabling the communication apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the D2D control circuitry 118 during the course of performing its functionalities.

The communication interface 114 may be embodied as any device or means embodied in circuitry, hardware, a computer program product comprising computer-readable medium (for example memory 112) storing computer-readable program instructions (e.g., software or firmware) that may be performed by a suitably configured processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the communication apparatus 102 and one or more computing devices or computing resources may be in communication. As an example, the communication interface 114 may be configured to enable communication between the communication apparatus 102 and another device, such as another communication apparatus 102 over a D2D connection, such as the D2D connection 108. As a further example, the communication interface 114 may be configured to enable communication with the serving network apparatus 104 via the network 106. The communication interface 114 may additionally be in communication with the memory 112, user interface 116, and/or D2D control circuitry 118, such as via a bus(es).

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or D2D control circuitry 118, such as via a bus(es).

The D2D control circuitry 118 may be embodied as various means, such as circuitry, hardware, a computer program product comprising a computer-readable medium (for example memory 112) storing computer-readable program instructions (e.g., software or firmware) that may be performed by a suitably configured processing device (e.g., the processor 110), or some combination thereof and, in some embodiments, is embodied as or otherwise controlled by the processor 110. In embodiments wherein the D2D control circuitry 118 is embodied separately from the processor 110, the D2D control circuitry 118 may be in communication with the processor 110. The D2D control circuitry 118 may further be in communication with one or more of the memory 112, communication interface 114, or user interface 116, such as via a bus(es).

Figure 4:
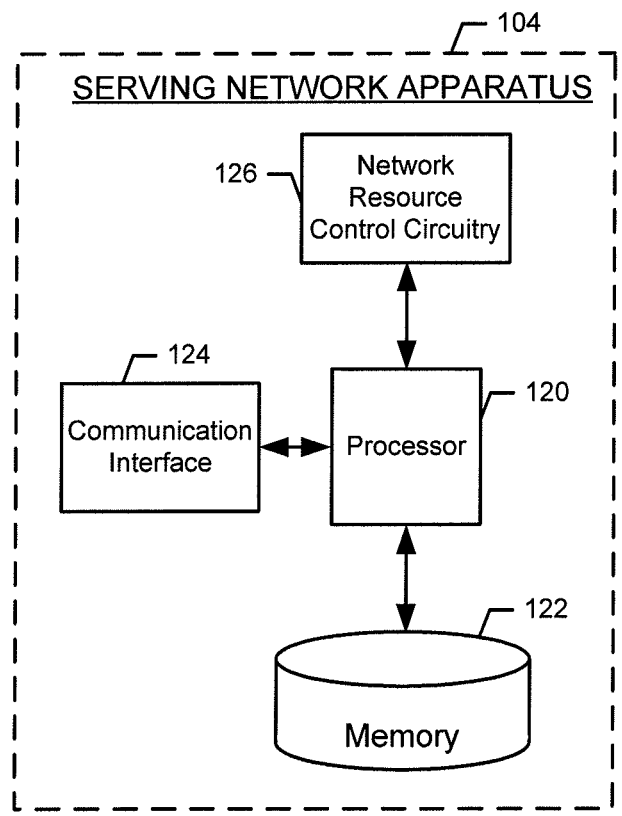
FIG. 4 illustrates a block diagram of a serving network apparatus according to some example embodiments.

FIG. 4 illustrates a block diagram of a serving network apparatus 104 according to some example embodiments. The serving network apparatus 104 may include various means for performing the various functions herein described. These means may comprise one or more of a processor 120, memory 122, communication interface 124, or network resource control circuitry 126. The means of the serving network apparatus 104 as described herein may be embodied as, for example, circuitry, hardware elements (e.g., a suitably programmed processor, combinational logic circuit, and/or the like), a computer program product comprising a computer-readable medium (for example, the memory 122) storing computer-readable program instructions (e.g., software or firmware) that may be performed by a suitably configured processing device (for example, the processor 120), or some combination thereof.

In some example embodiments, one or more of the means illustrated in FIG. 4 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or network resource control circuitry 126 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute means for performing one or more operations for providing the functionalities described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 120 may be configured to execute instructions stored in the memory 122 or otherwise accessible to the processor 120. These instructions, when executed by the processor 120, may cause the serving network apparatus 104 to perform one or more of the functionalities of the serving network apparatus 104 as described herein. As such, whether configured by hardware or software methods, or by a combination thereof, the processor 120 may comprise an entity capable of performing operations according to various example embodiments while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the serving network apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the serving network apparatus 104 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the network resource control circuitry 126 during the course of performing its functionalities.

The communication interface 124 may be embodied as any device or means embodied in circuitry, hardware, a computer program product comprising a computer-readable medium (for example, the memory 122) storing computer-readable program instructions (e.g., software or firmware) that may be performed by a suitably configured processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the serving network apparatus 104 and one or more computing devices or computing resources may be in communication. As an example, the communication interface 124 may be configured to enable communication with a communication apparatus 102 by the network 106, a radio uplink, and/or the like. The communication interface 124 may additionally be in communication with the memory 122, and/or network resource control circuitry 126, such as via a bus(es).

The network resource control circuitry 126 may be embodied as various means, such as circuitry, hardware, a computer program product comprising a computer-readable medium (for example, the memory 122) storing computer-readable program instructions (e.g., software or firmware) that may be performed by a suitably configured processing device (for example, the processor 120), or some combination thereof and, in some embodiments, is embodied as or otherwise controlled by the processor 120. In embodiments wherein the network resource control circuitry 126 is embodied separately from the processor 120, the network resource control circuitry 126 may be in communication with the processor 120. The network resource control circuitry 126 may further be in communication with one or more of the memory 122 or communication interface 124, such as via a bus(es).

In some example embodiments, the D2D control circuitry 118 associated with a first communication apparatus 102 may be configured to establish a carrier aggregation configuration defining a set of one or more component carriers usable for D2D communications between the first communication apparatus 102 and one or more second communication apparatuses (e.g., one or more additional communication apparatuses 102). In some example embodiments, as will be described further herein, two or more communication apparatuses 102 (e.g., the D2D control circuitry 118 associated with each of the respective communication apparatuses 102) may be configured to establish (e.g., negotiate) a carrier aggregation configuration without assistance form a serving network entity 104. In some example embodiments, in instances in which a carrier aggregation configuration for use in D2D communications is established without assistance from the serving network entity 104, D2D control circuitry 118 associated with a communication apparatus 102 participating in the D2D communication may be configured to cause the serving network entity 104 to be informed of the established carrier configuration so that the network resource control circuitry 126 may be aware of the usage of carrier aggregation on the D2D link. Additionally or alternatively, in some example, embodiments, as will be described further herein, a communication apparatus(es) 102 may be configured to establish a carrier aggregation configuration for D2D communication with assistance from the serving network apparatus 104 (e.g., with assistance from a network resource control circuitry 126 associated with the serving network apparatus 104), which may be configured to allocate and control usage of radio network resources that may be used for carrier aggregation on a D2D link.

The D2D control circuitry 118 may be further configured to cause a communication apparatus 102 to engage in D2D communication with a second communication apparatus in accordance with the established carrier aggregation configuration. Accordingly, in accordance with some example embodiments, component carriers, such as LTE/LTE-A carriers, may be aggregated for use in D2D communications.

In various example embodiments, frequency division duplexing (FDD) and/or time division duplexing (TDD) may be used for carrier aggregation. In this regard, FDD or TDD may be used for carrier aggregation on a D2D link. Similarly, FDD or TDD may be used for carrier aggregation on a link between a communication apparatus 102 and a network access point (for example, an eNB). Accordingly, by way of example, in instances wherein carrier aggregation is used both for D2D communications and for communications with a network access point, any of the following duplexing combinations are possible:

| Link to Access Point | D2D Link |
| --- | --- |
| FDD | FDD |
| FDD | TDD |
| TDD | FDD |
| TDD | TDD |

In case of multiplexing TDD on to FDD, the TDD communications may be in one or more of uplink or downlink frequencies or in one or more of both uplink and downlink frequencies of FDD.

In some instances, the frequencies and frequency bands used for D2D communications may be at least partly the same as used for a communication link(s) between a communication apparatus 102 and a network access point (for example, an eNB). In some example embodiments, the frequencies and frequency bands used for D2D communications may be such acquired by coexistence mechanisms, by shared authorized access principles, by rules of accessing white spaces, by any of cognitive means, by some combination thereof, and/or the like. In various example embodiments, the accessed spectrum may be available in a license-exempt or licensed manner, and the access may be specific to a local environment and/or a defined time. In some example embodiments, the D2D communication may apply on one or more extension carriers, which may deviate in any of its properties from a carrier applied for communications between a communication apparatus 102 and a network access point.

A set of one or more component carriers established in a carrier aggregation configuration may, for example, comprise a single set of one or more component carriers usable for both (1) D2D communications from a first communication apparatus 102, noted as "D1," to a second communication apparatus 102, noted as "D2"; and (2) D2D communications from D2 to D1. Alternatively, in some instances, the established set of one or more component carriers may comprise a first set of one or more component carriers usable for D2D transmissions from D1 to D2 and a second set of one or more component carriers usable for D2D transmissions from D2 to D1.

In this regard, it will be appreciated that in some example embodiments, carrier aggregation may be used in one link direction, (e.g., D1 transmits and D2 receives on aggregated carriers on a D2D link), or in both link directions (e.g., D1 transmits and receives; and D2 receives and transmits on aggregated carriers on a D2D link). Further, the carrier aggregations for D2D transmissions from D1 to D2 (e.g., D1:Tx→D2:Rx) may be different from the carrier aggregations for D2D transmissions from D2 to D1 (e.g., D2:Tx→D1:Rx). In this regard, in some example embodiments, it is possible to have carrier aggregation configurations independent to different link directions.

In some example embodiments, the D2D control circuitry 118 may be configured to manage activation of one or more component carriers from the set of component carriers configured for use in D2D communication with another communication apparatus 102. Management of activation of one or more component carriers may include activating one or more component carriers and/or deactivating one or more carriers. In this regard, component carriers that are designated as usable for D2D communication in the carrier aggregation configuration may be selectively activate/deactivated, such as based on network conditions, such as may be determined by measurements between a first and second communication apparatuses engaged in D2D communication, traffic needs, instruction from a network node, such as the serving network apparatus 104, and/or other factors. For example, if there is a lack of data to transmit on a D2D link, one or more component carriers may be deactivated. As another example, one or more component carriers may be activated to handle data queued to be sent, such as, for example, in an instance in which there is data queued to be transmitted and no component carriers are activated, in an instance in which a buffer of data queued to be transmitted exceeds a threshold condition such that one or more additional component carriers may need to be activated to handle the backlog, or otherwise it is a benefit to activate one or more additional component carriers and/or in response to other similar conditions. As still a further example, the serving network apparatus 104 (e.g., an eNB) may instruct a communication apparatus 102 to deactivate a component carrier on a D2D link, such as due to network interference conditions that may not be observed by devices participating in a D2D connection. By way of non-limiting example, other reasons for deactivation either by a device or by an eNB may be due to the lack of data to be transmitted on at least one of activated component carriers, or due to saving energy of the device by deactivating at least one of component carriers. In some example embodiments, activation/deactivation of a component carrier for use in one link direction (e.g., transmissions from D1 to D2) may be independent from activation/deactivation of the component carrier for use in the opposite link direction (e.g., transmissions from D2 to D1). In this regard, even if the carrier aggregation configurations are the same for both link directions, activation/deactivation of component carriers may be independent to different link directions. Further, in some example embodiments, activation/deactivation of a component carrier for use in D2D communication may be independent of activation/deactivation of a component carrier for use in communication between a communication apparatus 102 and a network access point for a serving network, such as the serving network apparatus 104 in example embodiments wherein the serving network apparatus 104 comprises an eNB or other network access point for the network 106.

As an example: D1 may negotiate a carrier aggregation configuration where component carriers #1 and #2 of D1 are used for eNB communications, and D2 may negotiate a carrier aggregation configuration where component carrier #1 is used for eNB communications. D1 and D2 may negotiate a carrier aggregation configuration for D2D communication between D1 and D2 in which component carriers #3, #4, and #5 are usable for D2D communication from D1 to D2 and component carriers #3 and #4 are usable for D2D communication from D2 to D1. At least momentarily, component carriers #3, #4, and #5 may be active for D2D transmissions from D1 to D2, meaning that D2 may receive Transport Blocks on any of component carriers #3, #4, and #5. For purposes of this example, only component carrier #3 may be active for use in the opposite link direction from D2 to D1 (for example, component carrier #4 may be momentarily deactivated for transmissions from D2 to D1), meaning that D2 transmits on component carrier #3 only and D1 receives Transport Blocks on component carrier #3 only. The operations on component carriers #3, #4, #5 may be independent of the activity of component carriers #1 and #2 as long as the eNB (e.g., network resource control circuitry 126 that may be associated with the eNB) does not signal limitations to the carrier aggregation configurations for device-to-device links on component carriers #3, #4, and/or #5.

In some example embodiments, it is possible to multiplex device-to-device resource allocations to a component carrier used for communications between a communication apparatus 102 engaged in D2D communications and a network access point. Accordingly, using the above example, D2D resource allocations, may be allocated by the serving network apparatus 104, may be multiplexed such that component carrier #1 and/or #2 may also be used for D2D communications. Additionally or alternatively, D2D resources may be allocated by the serving network apparatus 104 (e.g., by an eNB in example embodiments wherein the serving network apparatus 104 comprises an eNB) in a manner leaving the actual use of resources, including establishment of the component carrier configuration for use in D2D communications to be negotiated by the communication apparatuses 102 having the device-to-device link(s).

Figure 5:
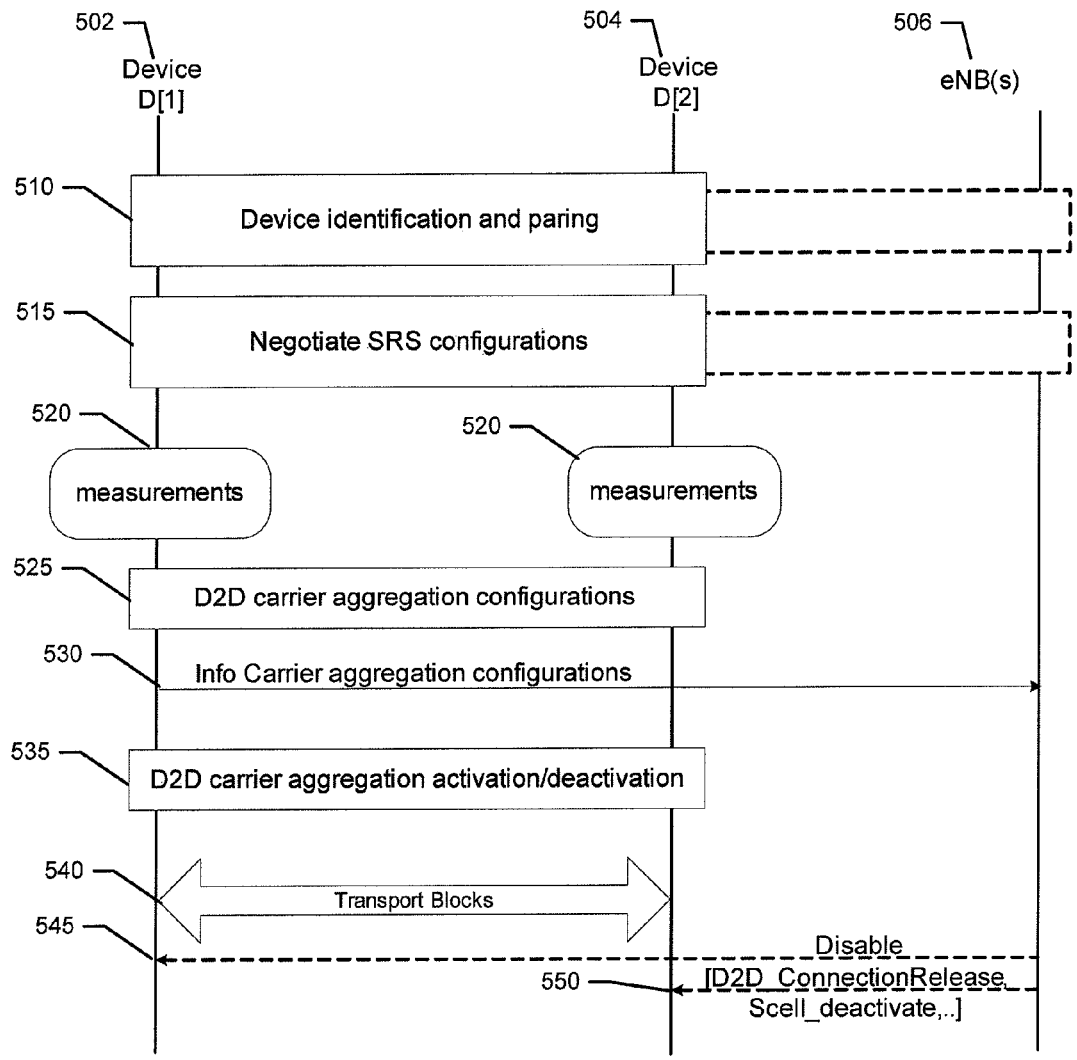
FIG. 5 illustrates a signaling diagram of signals that may be exchanged for facilitating of carrier aggregation for device-to-device communications according to some example embodiments.

Referring now to FIG. 5, FIG. 5 illustrates a signaling diagram of signals that may be exchanged for facilitating of carrier aggregation for device-to-device communications according to some example embodiments. In this regard, FIG. 5 illustrates a signaling diagram of signals that may be exchanged between a first device (D[1]) 502, a second device (D[2]) 504, and an eNB(s) 506. D[1] 502 and D[2] 504 may each respectively comprise embodiments of a communication apparatus 102. Accordingly, it will be appreciated that operations illustrated and described to be performed by D[1] 502 and/or by D[2] 504 may be performed by, with the assistance of, and/or under the control of D2D control circuitry 118. The eNB 506 may comprise an embodiment of a serving network apparatus 104. Accordingly, it will be appreciated that operations illustrated and described to be performed by the eNB 506 may be performed by, with the assistance of, and/or under the control of network resource control circuitry 126 that may be associated with the eNB 506. In some example embodiments wherein the eNB 506 comprises multiple eNBs, the eNBs may be in communication via an X2 interface. While the signaling diagram illustrated in FIG. 5 is described in the context of an LTE/LTE-A system, it will be appreciated that other cellular communication protocols may be substituted for LTE implementations in accordance with other example embodiments. Accordingly, for example, other network access point types may be substituted for the eNB 506 within the scope of the disclosure. Similarly, it will be appreciated that some example embodiments may utilize measurement signaling in addition to or in lieu of the sounding reference signal (SRS) signaling described and illustrated with respect to operations 515 and 520.

Operation 510 may comprise D[1] 502 and D[2] 504 performing device identification and pairing operations for establishing a D2D connection between D[1] 502 and D[2] 504. In this regard, the operation 510 may comprise D[1] 502 and D[2] 504 sharing and/or otherwise determining common identities for pairing. In this process, the eNB(s) 506 may be involved in assigning the identities. The eNB(s) 506 may also be involved in assisting D[1] 502 in the discovery and detection of D[2] 504 and/or in assisting D[2] 504 in the discovery and detection of D[1] 502. Until the configuration and activation of the D2D link and/or of activation of a D2D carrier aggregation on the D2D link, information exchange between D[1] 502 and D[2] 504 may take place via an eNB, such as the eNB 506. Device detection in operation 510 may, for example, be performed through direct detection mechanisms and/or with the assistance of an ANDSF.

Operation 515 may comprise D[1] 502 and D[2] 504 establishing (e.g., negotiating) a measurement signaling configuration (e.g., an SRS configuration) for use on the D2D connection. The SRS configuration may, for example, include the component carrier index, the periodicity of the SRS resource, the index of the SRS symbol in a subframe, the frequency indexes of Physical Resource Blocks (PRBs) of the SRS resource and the SRS sequence index. In some example embodiments, the eNB(s) 506 may be involved in negotiation of the SRS configurations for the device-to-device link. Additionally or alternatively, in some example embodiments, D[1] 502 and D[2] 504 may negotiate the SRS configuration without assistance from the eNB(s) 506.

Operation 520 may comprise D[1] 502 and/or D[2] 504 performing measurements in accordance with the SRS configuration negotiated in operation 515. Operation 520 may comprise D[1] 502 and D[2] 504 establishing (e.g., negotiating) a D2D carrier aggregation configuration defining a set of component carriers usable for transmission of Transport Blocks on the device-to-device links. The configuration exchange in operation 525 may, for example, occur via a local connection between D[1] 502 and D[2] 504, such as a Bluetooth connection. Configuration information exchanged over such a local connection may be contained within a protocol container including D2D carrier aggregation configurations (for example, LTE/LTE-A type carrier aggregation configurations).

The carrier aggregation configuration established in operation 525 may, for example, be the same for both link directions from D[1] to D[2] and from D[2] to D[1]. However, as previously discussed, the carrier aggregation configuration is not limited to being the same for both link directions, and, in some instances, a first set of one or more component carriers may be defined for communication in a first link direction and a second set of one or more component carriers may be defined for communication in the opposite link direction. In order for operation 525 to be performed, it is assumed in some example embodiments that both D[1] 502 and D[2] 504 are configured to communicate on multiple carriers, to make measurements and to handle eNB links and device-to-device links simultaneously.

In an instance in which the eNB 506 does not participate in establishment of the D2D carrier aggregation configuration, operation 530 may comprise one or more of D[1] 502 or D[2] 504 informing the eNB(s) 506 of the established carrier aggregation configuration. The eNB(s) 506 (e.g., network resource control circuitry 126 that may be associated with the eNB(s)) may be configured to disable D2D transmissions on one or more component carriers in some situations, such as if undesirable interference occurs on a radio uplink(s) due to the D2D transmissions.

Operation 535 may comprise D[1] 502 and/or D[2] 504 performing activation and/or deactivation of one or more of the component carriers configured for use in D2D communication between D[1] 502 and D[2] 504. In some example embodiments, the determination of whether to activate or deactivate a component carrier may be performed based at least in part on measurements between D[1] 502 and D[2] 504. The measurements may, for example, be made based at least in part on SRS signaling in accordance with the configuration established in operation 515. Operation 535 may comprise an ongoing and/or repeated operation during the lifetime of the D2D link between D[1] 502 and/or D[2] 504. In this regard, component carriers may be selectively activated and/or deactivated for use in transmission of transport blocks throughout the lifetime of the D2D link.

Activation of a component carrier may, for example, be triggered by the device originating a transmission, if the component carrier resource is defined as usable by (e.g., present in) the established carrier aggregation configuration. The deactivation of the component carrier may be performed in response to the initiative of either the transmitting device or the receiving device. In case a component carrier is deactivated, measurements for the component carrier may be relaxed. The component carrier may be deactivated in either link direction separately (for example, either D1 or D2 does not transmit on CC3) or to both link directions (for example, neither D1 nor D2 transmits or receives in CC3).

In some example embodiments, a communication apparatus 102, such as D[1] 502 and/or D[2] 504, may be configured to manage activation of one or more component carriers by way of a message indicating that one or more component carriers should be activated and/or that one or more component carriers should be deactivated. In this regard, in some example embodiments, D2D control circuitry 118 associated with D1 may be configured to format a message indicating that one or more component carriers should be activated and/or that one or more component carriers should be deactivated, and may cause the formatted message to be sent via the D2D communication link to D2. D2D control circuitry 118 associated with D2 may be configured to receive the message and manage activation of one or more component carriers based at least in part on the received message. In this regard, the D2D control circuitry 118 associated with D2 may activate/deactivate component carriers as indicated in the message.

In some example embodiments, the D2D control circuitry 118 associated with a communication apparatus 102 receiving a message indicating component carriers that should be activated/deactivated (e.g., D2 in the previous example) may elect to not activate a component carrier requested to be activated and/or may not deactivate a component carrier requested to be deactivated. The D2D control circuitry 118 associated with D2 may accordingly send a response message to D1 indicating which component carriers have been activated/deactivated so that D1 will know which component carriers have been activated and which remain deactivated.

In some example embodiments, a message that may be exchanged between communication apparatuses for managing activation of component carriers may comprise a Media Access Control (MAC) Control Element (MAC CE). In this regard, in accordance with some example embodiments, a MAC CE may be defined for controlling activation/deactivation of component carriers for links between a communication apparatus 102 and a network access point, such as for a link between a user equipment (UE) and an eNB (notated as a "UE-eNB link").

Figure 6A:
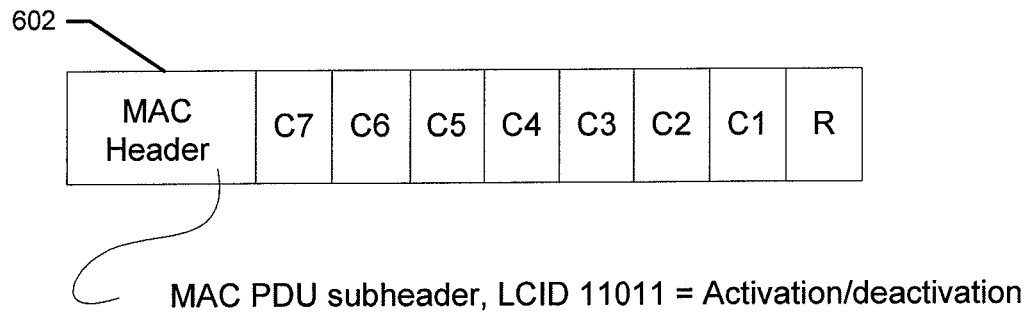
FIGS. 6A-6E illustrate example Media Access Control Element messages that may be used for managing activation of component carriers in accordance with some example embodiments.

FIGS. 6A-6E illustrate example Media Access Control Element messages that may be used for managing activation of component carriers in accordance with some example embodiments. FIG. 6A illustrates an example MAC CE that may be used for activation/deactivation of component carriers for links between a communication apparatus 102 and a network access point (for example, for a UE-eNB link) in accordance with some example embodiments.

Figure 6B:
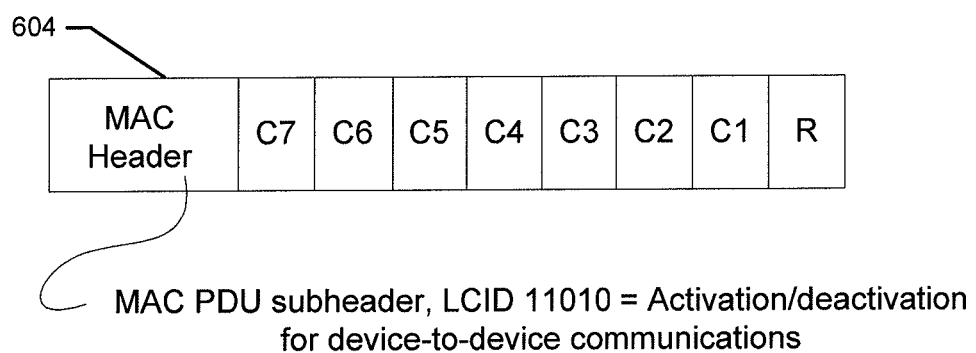

FIG. 6B illustrates an example MAC CE that may be used for activation/deactivation of component carriers for D2D links. In the example of FIGS. 6A and 6B, the component carriers are the same for D2D and UE-eNB links, from Component Carrier (CC) 7 (C7) to Component Carrier 1 (C1).

As illustrated in FIGS. 6A and 6B, in some example embodiments, the logical channel identity (LCID) that may be embedded in a MAC header 604 for a MAC CE used for activation/deactivation of component carriers for D2D links may differ from the LCID that may be embedded in a MAC header 602 for a MAC CE used for activation/deactivation of component carriers for UE-eNB links.

In this regard, in accordance with some example embodiments, a new LCID, such as 11010, may be reserved for signaling a D2D component carrier aggregation configuration. Accordingly, presence of this reserved LCID in the MAC packet data unit (PDU) subheader may inform the receiver that the PDU includes a bit field for activating/deactivating component carriers for d2d purposes. The payload may include a bit for every component carrier present in the carrier aggregation configuration, which may be selectively set to indicate whether the respective component carrier should be activated or deactivated. For example the bit "1" may indicate that a component carrier is activated/to be activated and bit "0" may indicate that a component carrier is deactivated/to be deactivated. In some example embodiments, the length of the bit field may match the number and order of component carriers in the carrier aggregation configuration.

Figure 6C:
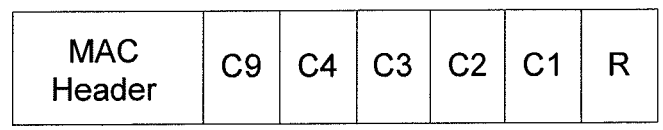

FIG. 6C illustrates another example MAC CE that may be used for activation/deactivation of component carriers for D2D links. In the example of FIG. 6C, the set of component carriers that are usable for D2D communications (C1, C2, C3, C4, C9) are different from the set of component carriers usable for UE-eNB links (C1, C2, C3, C4, C5, C6, C7) illustrated in FIG. 6A.

Signaling D2D carrier aggregation activation/deactivation separately from the UE-eNB activation/deactivation, as in some example embodiments, allows fully independent treatment of these aggregation types. In both cases, only those component carriers present in the carrier aggregation configuration are allowed to be activated/deactivated. Resources for carrier aggregation of D2D links may be fully the same component carriers as in use for UE-eNB links. Alternatively, resources for carrier aggregation of D2D links may be partly the same component carriers as used for UE-eNB links, but D2D aggregation may additionally happen for component carriers that are not usable for aggregation for the UE-eNB links. As still another possibility, it is possible to have D2D aggregation to fully happen on component carriers other than those usable for UE-eNB links.

According to some example embodiments, the list of transmitting component carriers and receiving component carriers may be signaled separately in the same MAC CE. In this case, there may first be the list of transmitting component carriers, for example, CC9CC4CC3CC2CC1R, and next the receiving component carriers, for example, CC9CC4CC3CC2CC1R. The bit fields may be arranged to other permutations (for example, CC9CC9 CC4CC4 CC3CC3 CC2CC2 CC1CC1 RR) having Tx flags first and Rx flags second, or vice versa.

Figures 6D, 6E:
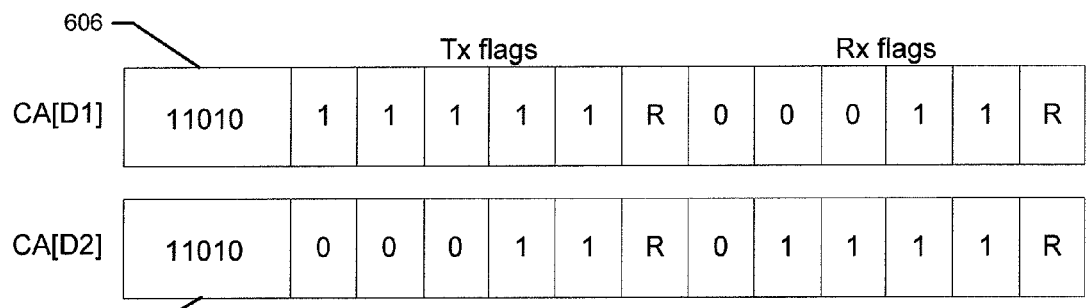

FIG. 6D illustrates an example MAC CE with component carrier activation/deactivation flags for D2D communications, with both Tx (e.g., D1→D2) and Rx (e.g., D2→D1) flags shown.

In some example embodiments, the transmitting side device may send a MAC CE for activating the transmitted component carriers. If the peer responds with the respective component carrier set ON in its receive component carrier list, the actual component carrier activation may occur. If, however, the peer device responds with that component carrier receive flag OFF, the component carrier activation is not completed, and that component carrier remains deactivated.

Referring now to FIG. 6E, an example MAC CE 606 is illustrated that may be sent from D1 to D2 to activate component carriers C9, C4, C3, C2, C1 for transmission, and to signal that it is ok to aggregate reception on C2 and C1. D2 may receive the MAC CE 606 and respond with the MAC CE 608, which may indicate that D2 cannot operate with C9 activated, but may acknowledge aggregation of C4, C3, C2 and C1. Further, D2 may aggregate C2 and C1 for transmission to D1 announced responsive to the MAC CE 606. Accordingly, C9 may remain deactivated, while C4, C3, C2 and C1 may be activated for communication from D1 to D2, and C2 and C1 may be activated for communication from D2 to D1.

Returning to FIG. 5, operation 540 may comprise D[1] 502 and D[2] 504 transmitting transport blocks on the D2D communication link on activated component carriers. Operation 545 may comprise the eNB 506 disabling the D2D connection between D[1] 502 and D[2] 504. Operation 550 may comprise the eNB 606 signaling D[2] 504 that D2D resources have been released.

In carrier aggregation, the connection to a cell which carries signaling radio bearers and which manages the radio resource connection may be called a Primary cell (Pcell), and the other component carriers may be called Secondary cells (Scell). Similarly, in device-to-device communications, all the component carriers of the carrier aggregation may be called "Scells." If the same carrier that has device-to-device traffic also contains multiplexed signaling radio bearers to the eNB, that carrier may be referred to as the "Pcell." However, for purposes of convention herein, the term Pcell in the case of a carrier carrying D2D traffic and multiplexed signaling radio bearers to an eNB may be applied only to those component carrier resources used for eNB communications, while the other resources (even if on the same frequency) used for the device-to-device links may be called Scell. In this regard, as illustrated in FIG. 5, operation 550 may comprise deactivating Scell.

Figure 7:
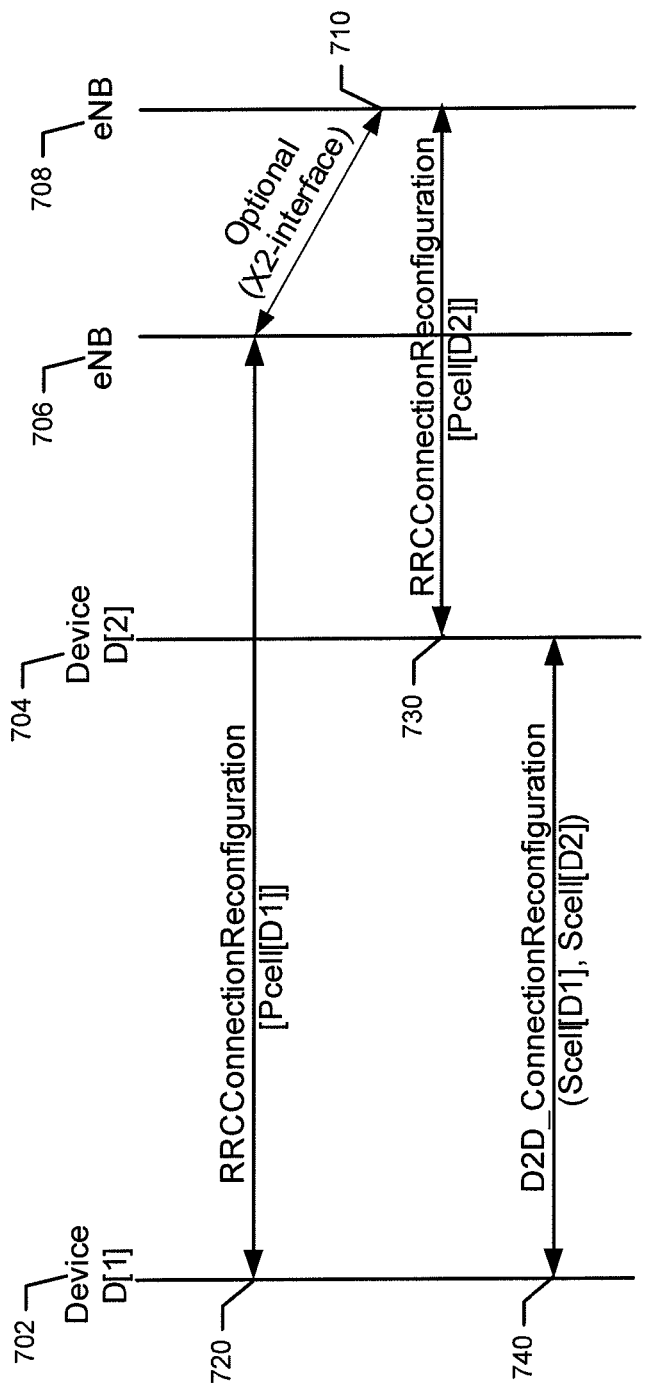
FIG. 7 illustrates a signaling diagram according to an example establishment of a device-to-device link by carrier aggregation according to some example embodiments.

FIG. 7 illustrates a signaling diagram according to an example establishment of a device-to-device link by carrier aggregation according to some example embodiments. In this regard, FIG. 7 illustrates a signaling diagram of signals that may be exchanged between a first device (D[1]) 702, a second device (D[2]) 704, an eNB 706 serving D[1] 702, and an eNB 708 serving D[2] 704. D[1] 702 and D[2] 704 may each respectively comprise embodiments of a communication apparatus 102. Accordingly, it will be appreciated that operations illustrated and described to be performed by D[1] 702 and/or by D[2] 704 may be performed by, with the assistance of, and/or under the control of D2D control circuitry 118. The eNB 706 and/or eNB 708 may each comprise an embodiment of a serving network apparatus 104. Accordingly, it will be appreciated that operations illustrated and described to be performed by the eNB 706 and/or by the eNB 708 may be performed by, with the assistance of, and/or under the control of network resource control circuitry 126. In some example embodiments, the eNB 706 and eNB 708 may comprise the same eNB. Alternatively, in some example embodiments, the eNB 706 and eNB 708 may comprise separate eNBs, which may, for example, be in communication with each other via an X2 interface 710. While the signaling diagram illustrated in FIG. 7 is described in the context of an LTE/LTE-A system, it will be appreciated that other cellular communication protocols may be substituted for LTE implementations in accordance with other example embodiments. Accordingly, for example, other network access point types may be substituted for the eNB 706 and/or for the eNB 708 within the scope of the disclosure.

As illustrated in FIG. 7, D[1] 702 has an RRC_Connection 720 to an eNB 706. Similarly, D[2] 704 has an RRC_Connection 730 to an eNB 708, which may be the same eNB as eNB 706, or different eNB. Hence both devices may communicate on a Pcell (carrier), and optionally on other Scells configured and activated. With the establishment of carrier aggregation for device-to-device communications, both D[1] 702 and D[2] 704 may define a common component carrier as their Scell, with the ScellType D2D, such as by performing a D2D_ConnectionReconfiguration procedure 740. An example of a D2D_ConnectionReconfiguration procedure that may be performed in accordance with some example embodiments is as follows:

```
Before device-to-device carrier aggregation;
RRCConnectionReconfiguration of D1 {
    Pcell[D1]
}
RRCConnectionReconfiguration of D2 {
    Pcell [D2]
}
After the Scell addition procedure, the configuration looks as;
RRCConnectionReconfiguration D1 {
    Pcell[D1]
    D2D_ConnectionReconfiguration {
        D2D_ConnectionIdentity
        Scell[D1]
        ScellType{D2D}
    }
}
RRCConnectionReconfiguration D2 {
    Pcell[D2]
    D2D_ConnectionReconfiguration {
        D2D_Connection Identity
        Scell[D2]
        ScellType{D2D}
    }
}
```

In the above example, the parameters of the SCell[D1] and Scell[D2] may be equal. In this regard, their carrier frequency, carrier bandwidth, control and data channel configurations may be consistent.

Figure 8:
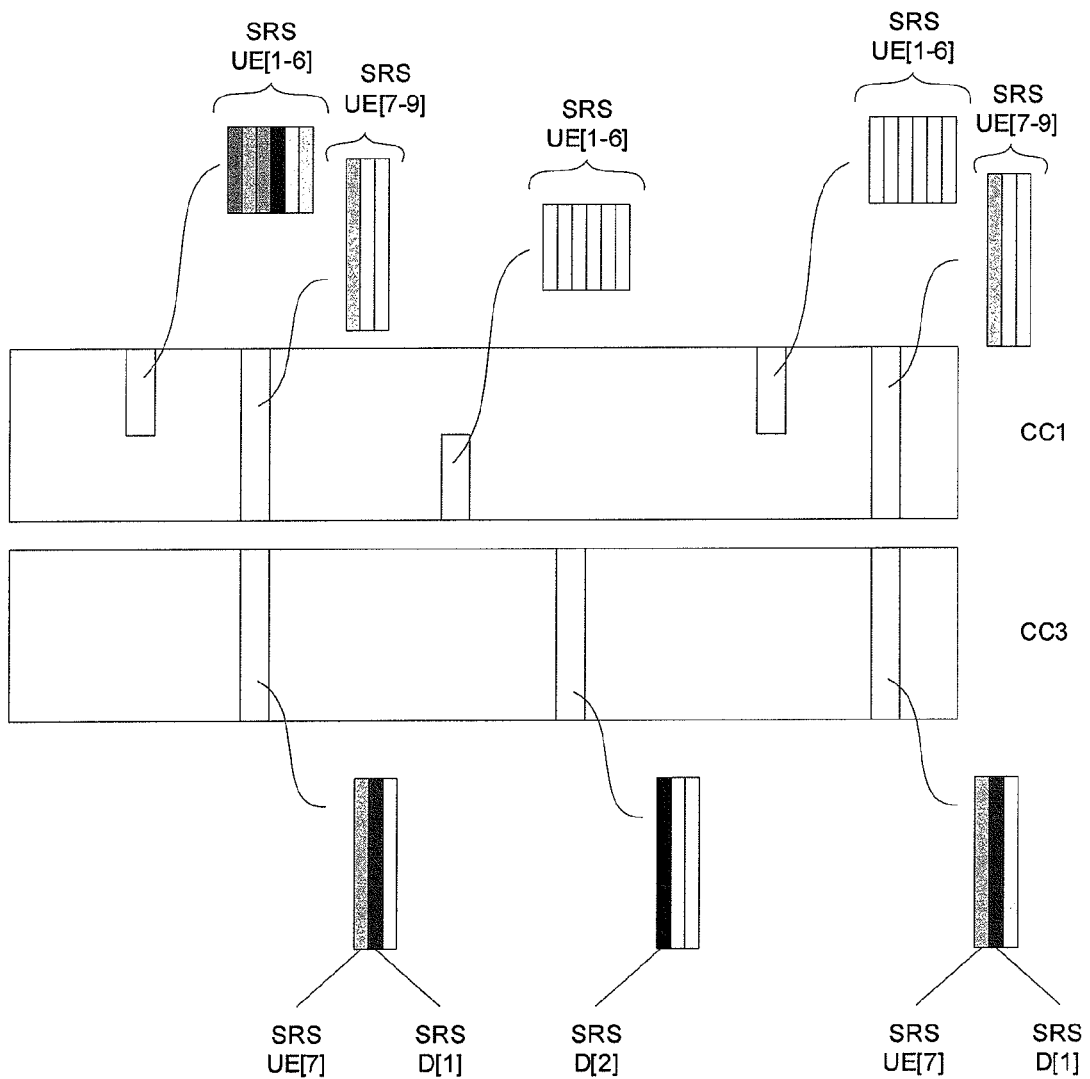
FIG. 8 illustrates an example of Sounding Reference Signal configurations on component carriers in a carrier aggregation scheme according to some example embodiments.

It will be appreciated, however, that the above-presented D2D_ConnectionReconfiguration procedure is provided by way of example, and not by way of limitation. As such, other D2D_ConnectionReconfiguration procedures are contemplated within the scope of the disclosure. For example, rather than nesting the D2D_Connection Reconfiguration into the RRCConnectionReconfiguration, the D2D_ConnectionReconfiguration may be flat within the structure. In this regard, in embodiments wherein the D2D_ConnectionReconfiguration is flat within the structure, the structure may not contain inner structures, but rather the information elements (e.g., all of the information elements) may appear inside the same RRCConnectionReconfiguration structure. As still a further alternative example, the D2D_ConnectionReconfiguration may appear as a separate structure distinct from the RRCConnectionReconfiguration structure. Regardless of the structure, in some example embodiments, each Scell type and D2D Connection identity may need to be present per information element for an unambiguous treatment. FIG. 8 illustrates an example of SRS configurations on component carriers in a carrier aggregation scheme according to some example embodiments. In this example both component carrier 1 (CC1) and component carrier 3 (CC3) carry traffic on the UE to eNB links. The SRS sequences may be multiplexed on to the Resource Elements (RE) of a single symbol in a given periodicity of subframes. Multiple SRS sequences may be multiplexed to the same REs if the sequences are sufficiently orthogonal. For example, Zadoff-Chu sequences with sufficiently large cyclic shifts may be used to create orthogonal. In the example of FIG. 8, UE[1], UE[2], UE[3], UE[4], UE[5], UE[6] may have their SRS multiplexed to the same symbol position so that the SRS hops to different Physical Resource Blocks (PRB) of CC1. UE[7], UE[8], UE[9] may have their SRS multiplexed to the same symbol position, which may be different from the SRS symbol positions of UE[1], UE[2], UE[3], UE[4], UE[5], UE[6]. The SRS of UE[7], UE[8], UE[9] may extend over the full bandwidth of CC1.

In the example of FIG. 8, UE[7] may also have UE to eNB links on component carrier 3 (CC3), and the SRS may appear in the corresponding symbol resources. The sequences of UE[7] on CC3 may be different from the sequences for UE[7] on CC1. Further, the periodicity or PRBs of the UE[7] SRS on CC3 can be different from those on CC1. Some UEs, such as D[1] and D[2] in the example of FIG. 8, may have device-to-device links activated on CC3. D[1] and D[2] transmit and receive SRS sequences to perform carrier aggregation measurements, such as may be used for component carrier configuration and activation/deactivation. D[1] SRS may be multiplexed to the same symbol resources with UE[7] SRS. In this example, there are no other SRS multiplexed to this symbol resource. However, it will be appreciated that another SRS may be multiplexed to the symbol resource if any other UE has SRS signaling needs. In that case, the eNB may then allocate a SRS sequence for the UE, so that the sequence is sufficiently orthogonal to the sequence of UE[7] and D[1]. In the example of FIG. 8, D[2] has its SRS transmission in another symbol resource, so that it is easy for both D[1] and D[2] to make measurements of each other's SRS sequences. These measurements may be used to decide on carrier aggregation configurations, component carrier activation/deactivation, for allocation of resources for the device-to-device link, and/or the like.

Figure 9:
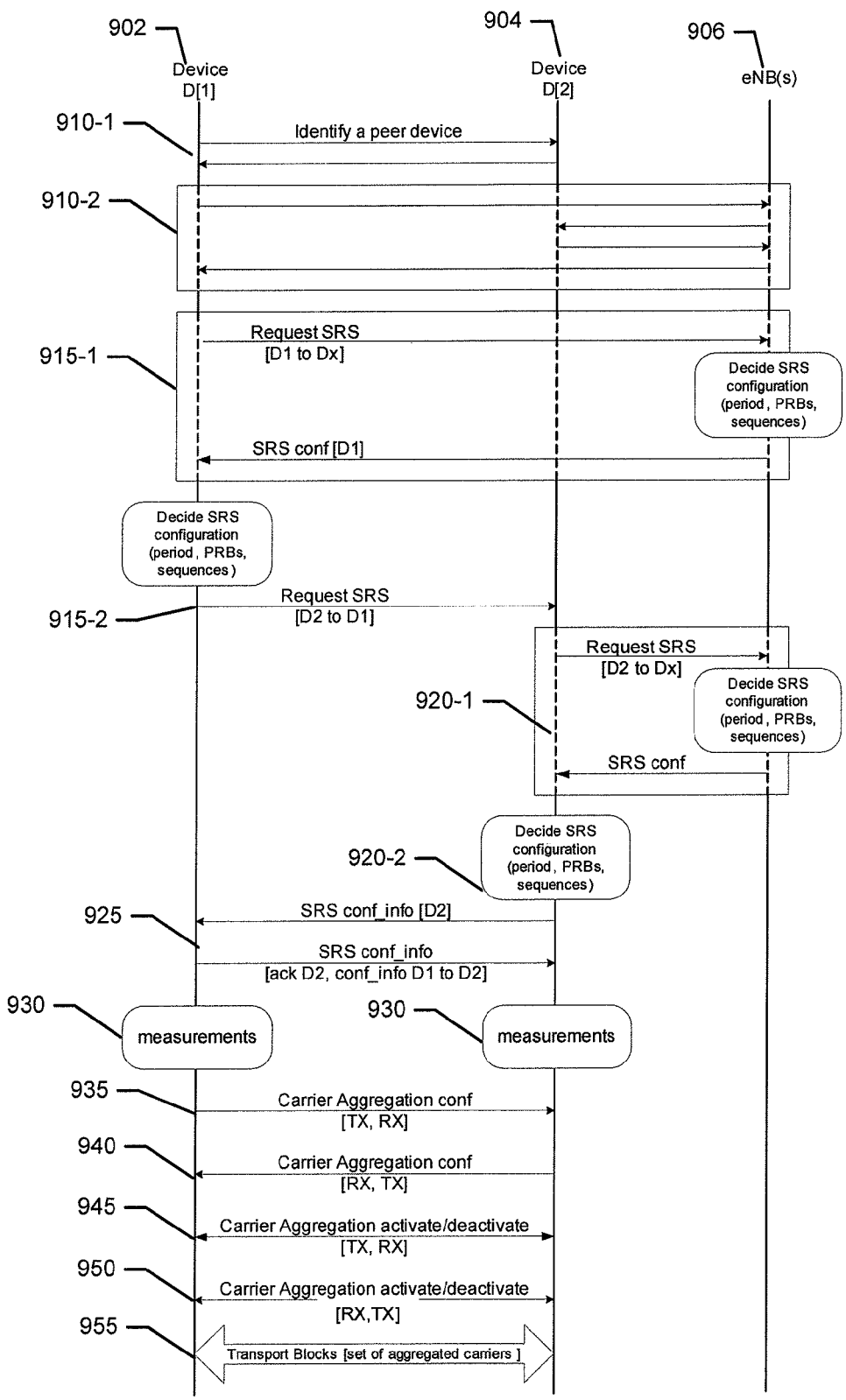
FIG. 9 illustrates another example signaling diagram of signals that may be exchanged for facilitating of carrier aggregation for device-to-device communications according to some example embodiments.

Referring now to FIG. 9, FIG. 9 illustrates another example signaling diagram of signals that may be exchanged for facilitating of carrier aggregation for device-to-device communications according to some example embodiments. In this regard, FIG. 9 illustrates a signaling diagram of signals that may be exchanged between a first device (D[1]) 902, a second device (D[2]) 904, and an eNB(s) 906. D[1] 902 and D[2] 904 may each respectively comprise embodiments of a communication apparatus 102. Accordingly, it will be appreciated that operations illustrated and described to be performed by D[1] 902 and/or by D[2] 904 may be performed by, with the assistance of, and/or under the control of D2D control circuitry 118. The eNB 906 may comprise an embodiment of a serving network apparatus 104. Accordingly, it will be appreciated that operations illustrated and described to be performed by the eNB 906 may be performed by, with the assistance of, and/or under the control of network resource control circuitry 126 that may be associated with the eNB 906. In some example embodiments wherein the eNB 906 comprises multiple eNBs, the eNBs may be in communication via an X2 interface. While the signaling diagram illustrated in FIG. 9 is described in the context of an LTE/LTE-A system, it will be appreciated that other cellular communication protocols may be substituted for LTE implementations in accordance with other example embodiments. Accordingly, for example, other network access point types may be substituted for the eNB 906 within the scope of the disclosure. Similarly, it will be appreciated that some example embodiments may utilize measurement signaling in addition to or in lieu of the sounding reference signal (SRS) signaling.

Further, in the example of FIG. 9, the example signaling in boxes—operations 910-2, 915-1, and 920-1—represent alternative operations involving the eNB 906 controlling the carrier aggregation for D2D communications, which may be performed in addition to or instead of operations 910-1, 915-2, and 920-2, respectively. In this regard, this signaling may be fully or partially optional and, in some example embodiments, may be omitted. In some example embodiments, the eNB 906 may be able to disable D2D communication attempts by devices in its coverage area.

Operation 910 (e.g., operation 910-1 and/or 910-2) may comprise the devices D[1] 902 and D[2] 904 identifying each other as peer devices and performing pairing. Operation 910 may, for example, correspond to operation 510, as illustrated in and described with respect to FIG. 5.

Operation 915 (e.g., operation 915-1 and/or 915-2) may comprise D[1] 902 establishing an SRS configuration for use in making measurements to D[2] 904. In operation 915-1, D[1] 902 may not know the identity of D[2] 904, and thus may request the eNB 906 for an SRS configuration to an unknown device, designated as "Dx." The eNB 906 may respond with an SRS configuration for D[1] 902. In operation 915-2, D[1] 902 may be aware of the identity and proximity of D[2] 904, and may directly establish and request an SRS configuration with D[2] 904 without the assistance of the eNB 906.

Operation 920 (e.g., operation 920-1 and/or 920-2) may comprise D[2] 904 establishing an SRS configuration for use in making measurements to D[1] 902. In operation 920-1, D[2] 904 may not know the identity of D[1] 902, and thus may request the eNB 906 for an SRS configuration to an unknown device, designated as "Dx." The eNB 906 may respond with an SRS configuration for D[2] 904. In operation 920-2, D[2] 904 may be aware of the identity and proximity of D[1] 902, and may directly establish and request an SRS configuration with D[1] 902 without the assistance of the eNB 906.

Operations 915 and 920 may, for example, correspond to operation 515, as illustrated in and described with respect to FIG. 5.

Operation 925 announces the acquired SRS configuration of D2 for the information of D1. In this regard, D1 may utilize the configuration information acquired in operation 925 to measure the D2 to D1 link.

Operation 930 may comprise D[1] 902 and/or D[2] 904 performing measurements in accordance with the SRS configuration(s). In this regard, operation 930 may, for example, correspond to operation 520 as illustrated in and described with respect to FIG. 5. Operations 935 and 940 may comprise D[1] 902 and D[2] 904 establishing (e.g., negotiating) a D2D carrier aggregation configuration defining a set of component carriers usable for transmission of Transport Blocks on the device-to-device links. For example, operation 935 may define a carrier aggregation configuration for transmissions from D[1] 902 to D[2] 904, and operation 940 may define a carrier aggregation configuration for transmissions from D[2] 904 to D[1] 902. Operations 935 and 940 may, for example, correspond to operation 525, as illustrated in and described with respect to FIG. 5.

Operations 945 and 950 may comprise D[1] 902 and/or D[2] 904 performing activation and/or deactivation of one or more of the component carriers configured for use in D2D communication between D[1] 902 and D[2] 904. In some example embodiments, the determination of whether to activate or deactivate a component carrier may be performed based at least in part on measurements between D[1] 902 and D[2] 904. The measurements may, for example, be made based at least in part on SRS signaling in accordance with the established SRS configuration. Operation 945 may comprise managing activation of component carriers for use in transmissions from D[1] 902 to D[2] 904. Operation 950 may comprise managing activation of component carriers for use in transmissions from D[2] 904 to D[1] 902. In this regard, operations 945 and 950 may, for example, correspond to operation 525, as illustrated in and described with respect to FIG. 5.

Operation 950 may comprise D[1] 902 and D[2] 904 transmitting transport blocks on the D2D communication link on activated component carriers. D2D communication may, for example, be performed in Time Division Duplexing (TDD) mode, Frequency Division Duplexing (FDD) mode, and/or the like.

It will be appreciated that the order of signaling messages in some example embodiments may differ from the example ordering presented in the Figures, such as FIG. 5 and FIG. 9. Some procedures may be executed directly between the devices, instead of consulting the eNB for decision making. Similarly, SRS configurations may be negotiated with the eNB, or optionally a device may decide the configurations by itself.

According to some example embodiments, RRCConnectionReconfiguration may be augmented with a new set of definitions for device-to-device communications. An example of these definitions is provided below. However, it will be appreciated that alternative definitions are contemplated within the scope of the disclosure. For example, as an alternative, D2DConnectionReconfiguration may be applied without embedding it into the other RRCConnectionReconfiguration definitions.

```
RRCConnectionReconfiguration {
    D2DConnectionReconfiguration
}
D2DConnectionReconfiguration {
    D2DConnectionRelease
    ScellToReleaseList
    ScellToAddModList
}
D2DConnectionRelease{
    D2D_ConnectionIdentity
}
ScellToAddModList{
    D2D-ConnectionIdentity <instead of physical cell identity of the
        Scell>
    ScellIndex [1..maxScell]
    ScellType {D2D}
}
ScellToRelease {
    D2D_ConnectionIdentity
ScellIndex [1..maxScell]
    ScellType{D2D}
}
```

PhysicalConfigDedicatedScell for carrier aggregation currently includes definitions for the downlink and uplink carrier aggregation. Additional definitions for device-to-device communications may be included;

```
PhysicalConfigDedicatedScell {
    D2D_ConnectionIdentity
```

```
    D2D_CarrierFrequency
    D2D_CarrierBandwidth
    D2D_SchedulingConfig <describes scheduling principles for D2D>
        D2D_SRS Sounding Reference Symbol Configuration (also
Channel State Information reference)
        D2D_ConnectionIdentity
        D2D_ControlConfigDedicated <control channel configurations
        for D2D>
        D2D_DataConfigDedicated <data channel configurations for
        D2D>
}
```

The ScellIndex may reference a short identity of the secondary cell. The scope of this index may be extended to include device-to-device Scells. In this regard, a type field, such as {ScellType=D2D}, may be added.

Figure 10:
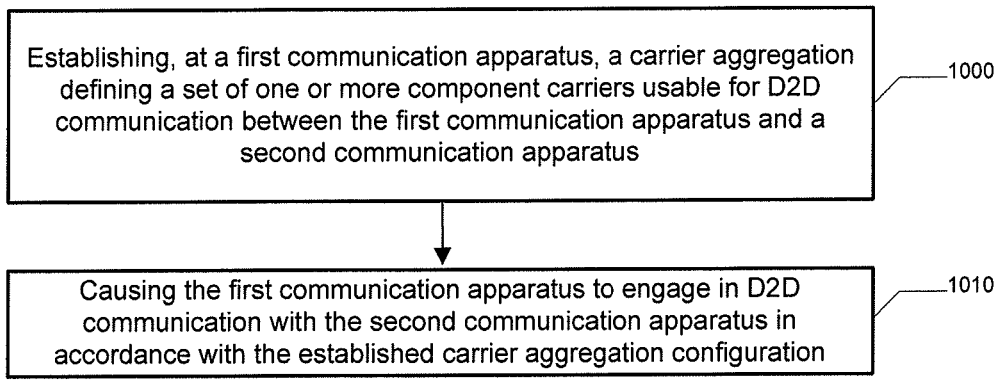
FIG. 10 illustrates a flowchart according to an example method for facilitating use of carrier aggregation for device-to-device communications according to some example embodiments.

FIG. 10 illustrates a flowchart according to an example method for facilitating use of carrier aggregation for device-to-device communications according to some example embodiments. In this regard, FIG. 10 illustrates operations that may be performed at a communication apparatus 102. The operations illustrated in and described with respect to FIG. 10 may, for example, be performed by, with the assistance of, and/or under the control of one or more of the processor 110, memory 112, communication interface 114, or D2D control circuitry 118. Operation 1000 may comprise establishing, at a first communication apparatus, a carrier aggregation configuration defining a set of one or more component carriers usable for D2D communication between the first communication apparatus and a second communication apparatus. The processor 110, memory 112, communication interface 114, and/or D2D control circuitry 118 may, for example, provide means for performing operation 1000. Operation 1010 may comprise causing the first communication apparatus to engage in D2D communication with the second communication apparatus in accordance with the established carrier aggregation configuration. The processor 110, memory 112, communication interface 114, and/or D2D control circuitry 118 may, for example, provide means for performing operation 1010.

FIG. 10 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a communication apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a communication apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out various embodiments. In some embodiments, a suitably configured processor (for example, the processor 110 and/or processor 120) may provide all or a portion of the elements. In other embodiments, all or a portion of the elements may be configured by and operate under control of a computer program product. The computer program product for performing the methods of embodiments of the invention includes a computer-readable storage medium (for example, the memory 112 and/or memory 122), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   establishing, at a first communication apparatus, a carrier aggregation configuration defining a set of one or more component carriers usable for device-to-device communication between the first communication apparatus and a second communication apparatus;
   causing the first communication apparatus to engage in device-to-device communication with the second communication apparatus in accordance with the established carrier aggregation configuration; and
   managing activation of one or more component carriers from the set of component carriers for use in device-to-device communication with the second apparatus, wherein managing activation of one or more component carriers comprises one or more of causing activation of one or more component carriers or causing deactivation of one or more component carriers, and wherein managing activation of one or more component carriers includes formatting a message indicating one or more component carriers to be activated or one or more component carriers to be deactivated, and causing the formatted message to be sent via a device-to-device communication link to the second communication apparatus.

2. The method of claim 1, wherein establishing the carrier aggregation configuration comprises establishing a configuration defining a first set of one or more component carriers usable for device-to-device transmissions from the first communication apparatus to the second communication apparatus and a second set of one or more component carriers for usable for device-to-device transmissions from the second communication apparatus to the first communication apparatus.

3. The method of claim 1, wherein establishing the carrier aggregation configuration comprises at least one of: establishing the carrier aggregation configuration directly with the second apparatus without assistance from a serving network entity, and establishing the carrier aggregation configuration with assistance from a serving network entity.

4. The method of claim 1, wherein managing activation of one or more component carriers comprises managing activation of one or more component carriers for use in device-to-device communication with the second apparatus independent of activation of component carriers used for communication between the first communication device and a network access point for a serving network.

5. The method of claim 1, wherein managing activation of one or more component carriers comprises determining based at least in part on a measurement between the first communication apparatus and the second communication apparatus whether to activate or deactivate a component carrier in the set of one or more component carriers for use in device-to-device communication with the second apparatus.

6. The method of claim 1, wherein managing activation of one or more component carriers comprises:
   receiving a message sent by the second communication apparatus via a device-to-device communication link indicating one or more component carriers to be activated or one or more component carriers to be deactivated; and
   managing activation of one or more component carriers based at least in part on the received message.

7. An apparatus comprising at least one processor and at least one memory storing computer program code, wherein the at least one memory and stored computer program code are configured, with the at least one processor, to cause the apparatus to at least:
   establish a carrier aggregation configuration defining a set of one or more component carriers usable for device-to-device communication between a first communication apparatus and a second communication apparatus;
   cause the first communication apparatus to engage in device-to-device communication with the second communication apparatus in accordance with the established carrier aggregation configuration and manage activation of one or more component carriers from the set of component carriers for use in device-to-device communication with the second apparatus, wherein managing activation of one or more component carriers comprises one or more of causing activation of one or more component carriers or causing deactivation of one or more component carriers, and wherein managing activation of one or more component carriers includes formatting a message indicating one or more component carriers to be activated or one or more component carriers to be deactivated, and causing the formatted message to be sent via a device-to-device communication link to the second communication apparatus;

the apparatus being embodied on the first communication apparatus.

8. The apparatus of claim 7, wherein the apparatus is caused to establish the carrier aggregation configuration at least in part by establishing a configuration defining a first set of one or more component carriers usable for device-to-device transmissions from the first communication apparatus to the second communication apparatus and a second set of one or more component carriers for usable for device-to-device transmissions from the second communication apparatus to the first communication apparatus.

9. The apparatus of claim 7, wherein establishing the carrier aggregation configuration comprises at least one of: establishing the carrier aggregation configuration directly with the second apparatus without assistance from a serving network entity, and establishing the carrier aggregation configuration with assistance from a serving network entity.

10. The apparatus of claim 7, wherein the apparatus is further caused to cause a serving network entity to be informed of the established carrier configuration.

11. The method of claim 7, wherein the apparatus is caused to manage activation of one or more component carriers at least in part by managing activation of one or more component carriers for use in device-to-device communication with the second apparatus independent of activation of component carriers used for communication between the first communication device and a network access point for a serving network.

12. The method of claim 7, wherein the apparatus is caused to manage activation of one or more component carriers at least in part by determining based at least in part on a measurement between the first communication apparatus and the second communication apparatus whether to activate or deactivate a component carrier in the set of one or more component carriers for use in device-to-device communication with the second apparatus.

13. The method of claim 7, wherein the apparatus is further caused to manage activation of one or more component carriers at least in part by:

receiving a message sent by the second communication apparatus via a device-to-device communication link indicating one or more component carriers to be activated or one or more component carriers to be deactivated; and managing activation of one or more component carriers based at least in part on the received message.

14. The apparatus of claim 7, wherein the apparatus is further caused to:

establish a measurement configuration for use on a device-to-device link between the first communication apparatus and the second communication apparatus.

15. The apparatus of claim 7, wherein the first communication apparatus and the second communication apparatus comprise cellular communication devices, and wherein the device-to-device communication between the first communication apparatus and a second communication apparatus uses resources of a serving cellular network.

16. The apparatus of claim 7, wherein the apparatus comprises or is embodied on a mobile computing device comprising user interface circuitry and user interface software stored on one or more of the at least one memory; wherein the user interface circuitry and user interface software are configured to:

facilitate user control of at least some functions of the mobile computing device through use of a display; and cause at least a portion of a user interface of the mobile computing device to be displayed on the display to facilitate user control of at least some functions of the mobile computing device.

* * * * *